United States Patent [19]

Fujita

[11] Patent Number: 4,594,923
[45] Date of Patent: Jun. 17, 1986

[54] CONTROLLER FOR CUTTING SHEET MATERIAL

[75] Inventor: Akihisa Fujita, Mihara, Japan

[73] Assignee: Mitsubishi Jukogyo Kabushiki Kaisha, Japan

[21] Appl. No.: 728,707

[22] Filed: Apr. 30, 1985

[30] Foreign Application Priority Data

May 2, 1984 [JP] Japan ................................. 59-89024

[51] Int. Cl.$^4$ .............................................. B26D 5/26
[52] U.S. Cl. .......................................... 83/74; 83/288; 83/303; 83/363; 83/364; 83/369; 83/370
[58] Field of Search ....................... 83/71, 74, 75, 288, 83/303, 363, 364, 369, 370; 318/600, 601

[56] References Cited

U.S. PATENT DOCUMENTS

| 4,020,406 | 4/1977 | Tokuno et al. ............... 83/76 X |
| 4,170,155 | 10/1979 | Saito et al. ................... 83/76 |
| 4,380,943 | 4/1983 | Evans ......................... 83/288 X |
| 4,387,614 | 6/1983 | Evans ......................... 83/288 X |

Primary Examiner—Frank T. Yost
Attorney, Agent, or Firm—McGlew and Tuttle

[57] ABSTRACT

A controller for cutting sheet material so that inferior or incomplete sheet material is eliminated is characterized by the provision of means for detecting a length of sheet passing through a rotary cutter which continuously cuts the sheet material, means for calculating a length of sheet moving until the sheet is cut after a shear is started, and means for controlling the start timing of the shear so that a cut portion of sheet cut first by the shear coincides with a cut portion of sheet cut by the rotary cutter.

11 Claims, 5 Drawing Figures

CONTROLLER FOR CUTTING SHEET MATERIAL

The present invention relates to a controller for cutting sheet material so that inferior or incomplete sheet material is eliminated, and which is applicable to a rotary shear control unit for use in a machine for manufacturing corrugated cardboard.

Referring to FIGS. 1 and 2, there is shown a prior art shear a for removing inferior sheet material, and a slitter unit b and a rotary cutter c are disposed subsequently to the shear. As shown in FIG. 2, such a shear is used to separate or remove an inferior portion d of the sheet material or change an order of units of the next stage.

In such a prior art apparatus, at the same time when an operator makes the removal operation of the inferior portion or makes the order change operation, the shear a is started to cut the portion d of the sheet. However, in such a case, since a first cut portion e of sheet (hereinafter referred to as a sheet trailing edge) cut by the shear a does not coincide with a cut portion f of sheet (hereinafter referred to as a sheet cut portion) cut by the rotary cutter c for continuously cutting the sheet d in a predetermined length, as shown in FIG. 3, a useless short piece g has been produced.

The present invention has been proposed to remove the prior art drawbacks and is to provide a controller for cutting sheet material in which a useless short piece of sheet produced at the starting of a shear in the prior art is not produced.

In order to achieve the above object, the controller for cutting sheet material according to the present invention comprises means for detecting cutting conditions of a rotary cutter, means for calculating a length of sheet passing until the sheet is first cut after a shear is started, and means for controlling a start timing of the shear so that a sheet trailing edge concides with a sheet cut portion cut by the rotary cutter.

The start timing is controlled on the basis of a time f(v) required until the velocity of the shear reaches a given sheet velocity v, a distance D between the shear and the rotary cutter, a length L of sheet to be cut, and the number n of sheet to be cut, as follows:

The length of sheet is calculated by an arithmetic operation unit in which a predetermined functional equation is set on the basis of a signal from a voltage generator for picking up the velocity of sheet material. The length of sheet given by the functional equation corresponds to an amount of movement of sheet during the starting of the shear. On the other hand, when the completion of cutting by the rotary cutter is detected, the length of cut sheet, the length of sheet between the shear and the rotary cutter and the result of the arithmetic operation unit are read in an arithmetic operation unit which calculates a delay time at the starting of the shear in the form of the movement quantity of sheet. The data of the movement quantity of sheet is preset in a counter and is decremented by a sheet movement pulse. When the count reaches zero, the shear is started.

The invention will be described in detail with reference to the accompanying drawings, in which.

Figure 1:
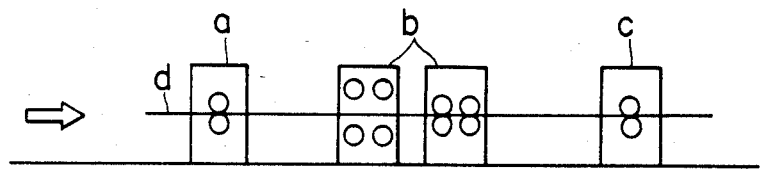
FIGS. 1 and 2 illustrate a prior art controller for cutting sheet material when operated generally and when changing the order.
Figure 2:
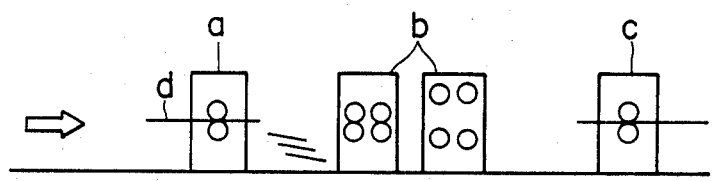
Figure 3:
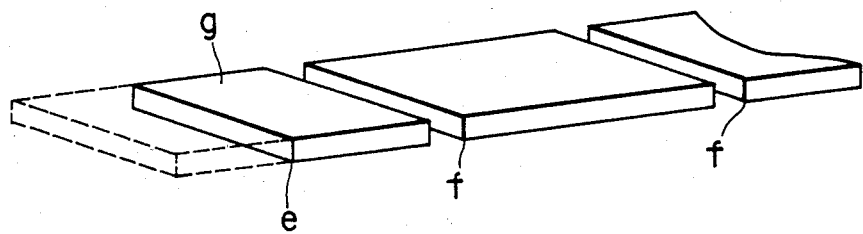
FIG. 3 is a perspective view for illustrating drawbacks in the prior art.
Figure 4:
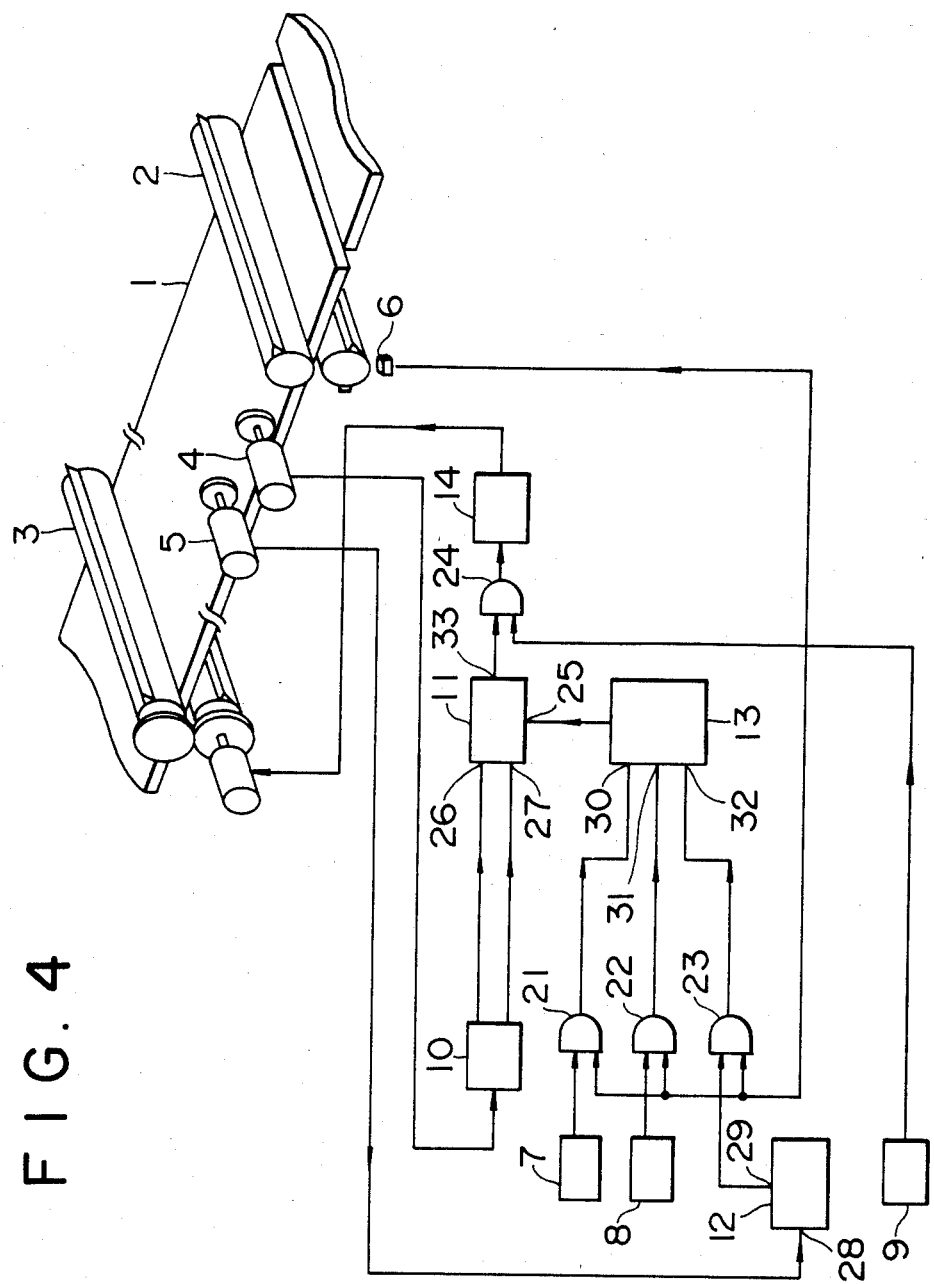
FIG. 4 is a block diagram with a perspective view of a controller for cutting sheet material showing an embodiment of the present invention.

Referring to FIG. 4 showing a block diagram of an embodiment in accordance with the present invention, numeral 1 denotes sheet material which is sequentially fed and cut in a proper length, numeral 2 a rotary cutter and 3 a shear. Numeral 4 denotes a pulse generator for detecting an amount of movement of the sheet material 1 and which is mounted in a measuring roller pressed on a surface of the sheet material 1 with a proper pressure so that pulses proportional to the amount of movement of the sheet material are produced. Numeral 5 denotes a voltage generator for detecting a velocity of movement of the sheet material 1 and which is mounted in a measuring roller similar to that of the pulse generator 4 so that a voltage proportional to the velocity of movement of the sheet material is produced.

Numeral 6 denotes a sensor such as a proximity switch for detecting the completion of cutting the sheet material by the rotary cutter 2. Numeral 7 denotes a switch for presetting a length of sheet to be cut by the rotary cutter, numeral 8 a switch for presetting a length of sheet between the shear and the rotary cutter, and numeral 9 an operational switch for starting the shear. Numeral 10 denotes a reverse rotation decision circuit for generating a normal rotation pulse and a reverse rotation pulse in accordance with an input signal of the pulse generator 4. Numeral 11 denotes a counter or an up-and-down counter having a preset input terminal 25, a normal rotation pulse input terminal 26 and a reverse rotation pulse input terminal 27.

Numeral 12 denotes an arithmetic operation unit for calculating a length of sheet passing until the sheet is first cut after the shear is started and which calculating the length on the basis of the movement velocity of the sheet supplied from a input terminal 28 in accordance with a predetermined functional equation and produces the result from an output terminal 29. Numeral 13 denotes an arithmetic operation unit for calculating a delay time of starting the shear in the form of a movement quantity of sheet required to cause a trailing edge of sheet to coincide with a cut portion of sheet by the rotary cutter, which reads in values inputted from terminals 30, 31 and 32 and supplies its calculated measured result to the counter 11. Numeral 14 denotes a drive circuit for the shear, and numerals 21–24 denote gates. In FIG. 4, the shear is driven by a single motor but it may be driven by a motor in a production line of the sheet material through a line shaft and a clutch.

Operation of the embodiment constructed above will now be described. The voltage generator 5 produces a velocity signal of the sheet material 1 to supply it to the arithmetic operation unit 12 in which a predetermined functional equation is given. The operation unit 12 performs the calculation on the basis of the inputted signal and always produces the calculated result f(v) from the terminal 29.

The functional equation is generally given by a following quadratic equation:

$$f(v) = \tfrac{1}{2}(K \cdot v^2 + 2 \, t0 \cdot v = 1) \ldots \quad (1)$$

Figure 5:
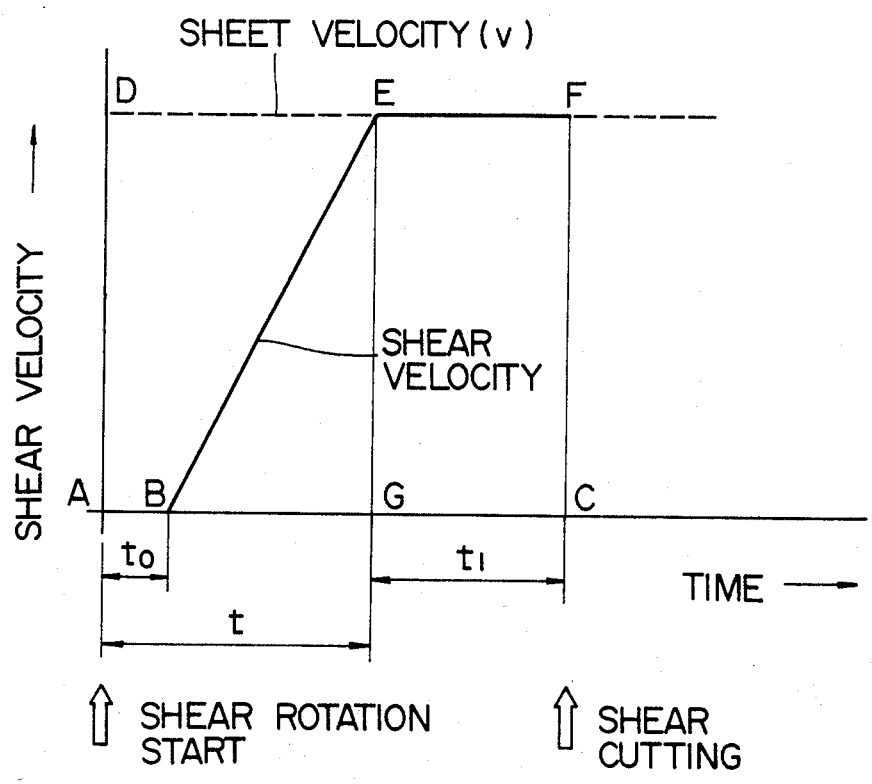
FIG. 5 is a graph illustrating the variation a time-coordinated graph of the sheet velocity and the shear cutting edge velocity.

The meaning of the functional equation will now be described for the case of the motor drive but it can be applicable to the case of the clutch drive in the same manner. When the sheet material 1 is moved at a speed v, the velocity of the cutting edge of the shear must be v in order to cut the sheet material 1 by the shear 3. FIG. 5 shows a variation in time of the sheet velocity and the cutting edge velocity of the shear when the cutting edge velocity of the shear 3 which has been first at a standstill reaches a velocity v. The time t required until the cutting edge velocity of the shear reaches the velocity v is given by the following equation (2):

$$t = t_0 + \frac{GD^2}{375} \cdot \frac{N}{TM - TL} \quad (2)$$

where $t_0$: is a signal delay time of a switch or the like, $GD^2$ is a flywheel effect of the shear and the motor, TM is a torque produced by the motor, TL is a load torque to the shear, and N is a rotational speed of the motor depending upon the shear velocity Now, the rotational velocity N of the motor is proportional to the cutting edge velocity v of the shear Since $GD^2$, TM and TL are determined to be constant by the shear and the motor, the above equation (2) is simplified as follows:

$$t = t_0 + K \cdot v \ldots \quad (3)$$

Suppose the peripheral length of the shear is l, the sheet material is moved by l/2 until it reaches a cutting position C, since the shear normally stops at a top dead point. In other words, the area of a trapezoid defined by points B, C, F and E of FIG. 5 is equal to l/2. Accordingly, the time $t_1$ between points G and C is given by the following equation (4).

$$t = \frac{1}{2v}(l - K \cdot V^2) \quad (4)$$

The length of sheet f(v) feeding until the sheet is cut by the shear after producing a start command for the shear is an area defined by points A, C, F and D and is expressed by the following equation (5):

$$f(v) = (t + t_1) \cdot V \ldots \quad (5)$$

The equation (1) is obtained by substituting the equations (2) to (4) for the equation (5).

When the sensor 6 detects the completion of cutting by the rotary cutter, the gates 21 to 23 are opened to supply the sheet cut length signal L from the switch 7, the sheet length signal D from the switch 8 between the shear 3 and the rotary cutter 2 and the output signal from the operation unit 12, that is, the sheet length f(v) to the operation unit 13.

The operation unit 13 calculates $x = L \cdot n - D - f(v)$, where n represents the number of cutting operations of the rotary cutter 2 after the shear has been started and satisfies the following condition.

$$L \cdot (n-1) < D + f(v) \leq L \cdot n$$

The value x thus obtained expresses the delay time in the form of the sheet length until the shear is started after the sheet material has been cut by the rotary cutter in order to cause the trailing edge of sheet to coincide with the cut portion of sheet cut by the rotary cutter.

The sheet length data x is preset in the counter 11 and is decremented by the sheet movement pulses from the pulse generator 4. When the count of the counter 11 is reduced to zero, the counter produces an output signal. At this time, when the shear start button is pressed, the output signal of the counter 11 drives the drive circuit 14 of the shear through the gate 24 to start the rotation of the shear. Consequently, the position cut by the shear coincides with the position cut by the rotary cutter.

As described in detail above, the controller comprising the simple logic circuit and the arithmetic operation circuit is provided in the preceding stage of the shear drive unit so that the start timing of the shear is controlled to thereby cause the trailing edge of sheet to coincide with the cut portion of sheet by the rotary cutter and therefore the making of useless short pieces of sheet material can be prevented. Further, not only the loss of sheet material but also the removal operation of useless short pieces which has been required in the sheet material production process and in the process changing operation can be diminished, and hence the productivity can be improved.

What is claimed is:

1. A controller for cutting sheet material so that inferior sheet material is eliminated, comprising means for detecting a length of sheet passing through a rotary cutter, means for detecting a velocity v of the sheet, means for detecting completion of cutting operation of the rotary cutter, means for calculating a length f(v) of the sheet moving until a velocity of a cutting edge of a shear is equal to a velocity of the sheet after the shear has been started on the basis of the velocity of the shear, delay time setting means for calculating a delay time x at the starting of the shear so that a cut portion of sheet first cut by the shear coincides with a cut portion of sheet by the rotary cutter, and timing control means for controlling a start timing of the sheet on the basis of an output of said setting means.

2. A controller according to claim 1, wherein said delay time x at the starting of the shear is calculated on the basis of the following equation:

$$x = L \cdot n - D - f(v)$$

where L is a length of the sheet cut by the rotary cutter, n is the number of cutting operations after the shear is started, and D is a distance between the shear and the rotary cutter.

3. A controller according to claim 1, wherein the shear stops at a top dead point and the length f(v) is calculated on the basis of the following equation:

$$f(v) = \tfrac{1}{2}(K \cdot v^2 + 2t_0 \cdot v + l)$$

where K is a proportional constant, $t_0$ is a signal delay time of a switch or the like, and l is a peripheral length of the shear.

4. A controller according to claim 1, wherein said means for detecting the length of sheet passing through the rotary cutter comprises a pulse generator which is mounted in a measuring roller pressed on a surface of the sheet material with appropriate pressure and generates pulses having the number proportional to an amount of movement of the sheet material.

5. A controller according to claim 1, wherein said means for detecting the velocity of sheet passing through the rotary cutter comprises a voltage generating circuit which is mounted in a measuring roller pressed on a surface of the sheet material with appropriate pressure and generates a voltage proportional to the velocity of sheet material.

6. A controller according to claim 1, wherein said means for detecting the completion of the cutting operation of the rotary cutter comprises a proximity switch.

7. A controller according to claim 1, wherein said delay time setting means comprises length pre-setting means for presetting a length L of sheet cut by the rotary cutter and distance presetting means for presetting a distance D between the shear and the rotary cutter.

8. A controller according to claim 7, wherein said delay time setting means comprises a first gate having two inputs including an output of said length presetting means and an output of said completion detecting means, a second gate having two inputs including an output of said distance presetting means and an output of said completion detecting means, a third gate having two inputs including an output of said length f(v) calculating means and an output of said completion detecting means, and delay time calculating means having three inputs including outputs of said first, second and third gates.

9. A controller according to claim 1, wherein said timing control means comprises a counter which can be preset by the output of said delay time setting means and count input pulses corresponding to a signal from said means for detecting the length of sheet passing through the rotary cutter.

10. A controller according to claim 9, wherein said counter comprises a up-and-down counter.

11. A controller according to claim 9, wherein said timing control means comprises a fourth gate having two input including an output of said counter and an output of a switch for starting the shear and a shear drive circuit controlled by an output of said fourth gate.

* * * * *

UNITED STATES PATENT OFFICE
CERTIFICATE OF CORRECTION

Patent No. 4,594,923  Dated June 17, 1986

Inventor(s) Akihisa Fujita

It is certified that error appears in the above-identified patent and that said Letters Patent are hereby corrected as shown below:

Column 2, line 65 - $f(v) = \frac{1}{2}(K \cdot v^2 + 2 t_0 \cdot v + 1)$

Column 4, line 7 - $L \cdot (n-1) < D + f(v) \leq L \cdot n$

Signed and Sealed this

Eleventh Day of October, 1988

Attest:

DONALD J. QUIGG

Attesting Officer  Commissioner of Patents and Trademarks